(12) United States Patent
McKenzie et al.

(10) Patent No.: US 7,248,632 B1
(45) Date of Patent: Jul. 24, 2007

(54) VIDEO DATA STORAGE AND TRANSMISSION SYSTEM AND METHOD

(75) Inventors: Ronald J. McKenzie, Fairfax, VA (US); Daniel P. Forlai, Fairfax, VA (US); Brad Whitney, Winchester, VA (US)

(73) Assignee: Len Gollobin, McLean, VA (US)

( * ) Notice: Subject to any disclaimer, the term of this patent is extended or adjusted under 35 U.S.C. 154(b) by 930 days.

(21) Appl. No.: 10/603,610

(22) Filed: Jun. 26, 2003

Related U.S. Application Data (60) Provisional application No. 60/392,024, filed on Jun. 28, 2002.

(51) Int. Cl.
*H04B 1/66* (2006.01)
(52) U.S. Cl. .................................. 375/240.2
(58) Field of Classification Search ........... 375/240.01, 375/240.2, 240.25, 240.29, 240.12; 358/1.13; *H04B 1/66*
See application file for complete search history.

(56) References Cited

U.S. PATENT DOCUMENTS

| | | | |
|---|---|---|---|
| 4,281,354 A | 7/1981 | Conte ............................ 360/5 |
| 4,618,976 A | 10/1986 | Haendle ...................... 378/99 |
| 4,719,514 A | 1/1988 | Kurahayashi et al. ....... 358/261 |
| 4,917,541 A | 4/1990 | Carruba ...................... 405/227 |
| 4,974,074 A | 11/1990 | Tenma ........................ 358/92 |
| 5,022,088 A | 6/1991 | Hisada et al. .................. 382/41 |
| 5,109,278 A | 4/1992 | Erickson et al. ............ 358/108 |
| 5,111,291 A | 5/1992 | Erickson et al. ............ 358/108 |
| 5,144,661 A | 9/1992 | Shamosh et al. ............... 380/9 |
| 5,237,408 A | 8/1993 | Blum et al. ................. 358/108 |
| 5,287,420 A | 2/1994 | Barrett ....................... 382/56 |
| 5,367,332 A | 11/1994 | Kerns et al. .................. 348/61 |
| 5,463,776 A | 10/1995 | Voigt et al. ................. 395/600 |
| 5,581,297 A | 12/1996 | Koz et al. ................... 348/152 |
| 5,615,017 A | 3/1997 | Choi ......................... 386/109 |
| 5,671,389 A | 9/1997 | Saliba ........................ 395/438 |
| 5,686,961 A | 11/1997 | Gasztonyi et al. .......... 348/390 |
| 5,751,346 A | 5/1998 | Dozier et al. ............... 348/153 |
| 7,085,321 B2* | 8/2006 | Peset Llopis .......... 375/240.12 |
| 2004/0001214 A1* | 1/2004 | Monroe ..................... 358/1.13 |

\* cited by examiner

*Primary Examiner*—Tung Vo
(74) *Attorney, Agent, or Firm*—Jacobson Holman PLLC (57) ABSTRACT

A video data storage and transmission system for security surveillance using a combination of data compression techniques which enable the system to operate effectively in limited bandwidth scenarios such as those found in commercial aircraft communication. High quality video is captured in the cabin or cockpit of an aircraft and stored or transmitted with sufficient update rate to enable a ground operator to confidently assess the conditions on board the aircraft in a short time. The quality of the video may be dynamically changed, and the transmission of video from air to ground initiated, at either the on-board transmitter or ground-based receiver.

19 Claims, 8 Drawing Sheets

VIDEO DATA STORAGE AND TRANSMISSION SYSTEM AND METHOD

This application is entitled to and claims the priority of co-pending U.S. Provisional Application No. 60/392,024, filed on Jun. 28, 2002.

BACKGROUND OF THE INVENTION

1. Field of the Invention

The present invention is related to the field of video data storage and transmission and, more particularly, to a system and method for compressing video images through conversion thereof from a time to frequency domain, enabling selectable storage and transmission quality of the recorded images on a dynamic basis.

2. Description of the Related Art

Conventional MPEG, JPEG and wavelet technologies that rely upon the streaming of information require a predetermined bandwidth in order to transmit video images. When the available bandwidth falls below a required threshold value, the transmission cannot be completed. Thus, in limited bandwidth scenarios, such as those encountered when transmitting from an aircraft, conventional video data formats are often unable to handle the data transfer requirements that may be encountered.

Furthermore, in many video recording applications such as security monitoring, for example, much of the recorded video is routine and uneventful, making it undesirable and impractical to waste the considerable space necessary for storage of conventional video images. However, should an event occur during a surveillance period such that detailed video images are required, storage of data with sufficient detail is necessary to render the stored images of value.

The specific application of security monitoring on board aircraft is of particular interest today following the attack on the World Trade Center in New York and the Pentagon near Washington, D.C. While prior to Sep. 11, 2001, the threat of loss of life on an airliner was not considered to be great, today it is recognized that commercial aircraft must be viewed as potential weapons with the capacity for generating significant destruction. The risk to the public at large and the need to protect critical government and public infrastructure could result in the ordering of U.S. tactical aircraft to deliberately shoot down a commercial airliner. Such a decision should only be made with the greatest care and yet the timeline to make this decision may be very short. Hence, it is essential to have as close to perfect situational awareness as is possible in the circumstances at hand. Unfortunately, current voice and aircraft ground radar tracking data may not provide the necessary information directly into the hands of the civilian or military authorities responsible for making the decision as to whether action must be taken to disable the aircraft.

Therefore, a need exists for a system and method that provides real-time video information from an aircraft in flight that is of sufficient quality and update rate to enable ground control personnel to accurately ascertain the situation on board the aircraft in order to take appropriate action. In conjunction therewith, a need exists for a video storage and transmission system and method in which video images can be recorded and stored with variable definition according to operator needs and selection, as well as transmitted effectively in limited bandwidth environments.

SUMMARY OF THE INVENTION

In view of the foregoing, one object of the present invention is to overcome the difficulties of video data transmission when limited bandwidth is available.

Another object of the present invention is to provide for the selection of variable degrees of image definition for storage and transmission of video images on a dynamic, real-time basis.

A further object of the present invention is to provide a system and method that enables the capture and transfer of high quality video with sufficient update rate to convey to a remote location an accurate understanding of the scene being monitored.

A still further object of the present invention is to provide a data format and transmission format which preserves the security and privacy of the video, ensuring that only authorized receivers of the data will have access thereto.

Another object of the present invention is to provide bi-directional control that allows an operator to remotely and dynamically select the quality of video or audio being recorded and transmitted in response to current and/or changing requirements.

In accordance with this and other objects, the present invention is directed to a video monitoring system that may be used to protect passengers and aircraft while in flight or on the ground. The system includes sensors or trigger devices, recording devices, video cameras and microphones, and a means for transmitting digital data to a secure remote location. The trigger devices are used to initiate an alarm or alert condition which is sensed by a controller device that converts input video and audio, or video alone, into a digital data stream which can be transmitted to a receiving station using external communication systems. The video that is received has a sufficient quality and update rate to enable reviewing personnel to make a complete assessment of the events transpiring on board the aircraft.

The controller device also oversees the recording of data from cameras while the unit is in a powered but unalarmed state. Upon alarm, the unit automatically begins the transmission of video from a point in time just before the alarm, as well as live video and, if desired, audio. This "pre-alarm recall" feature is known in the art and discussed in U.S. Pat. No. 5,237,408, the disclosure of which patent is hereby incorporated by reference as if fully set forth herein.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
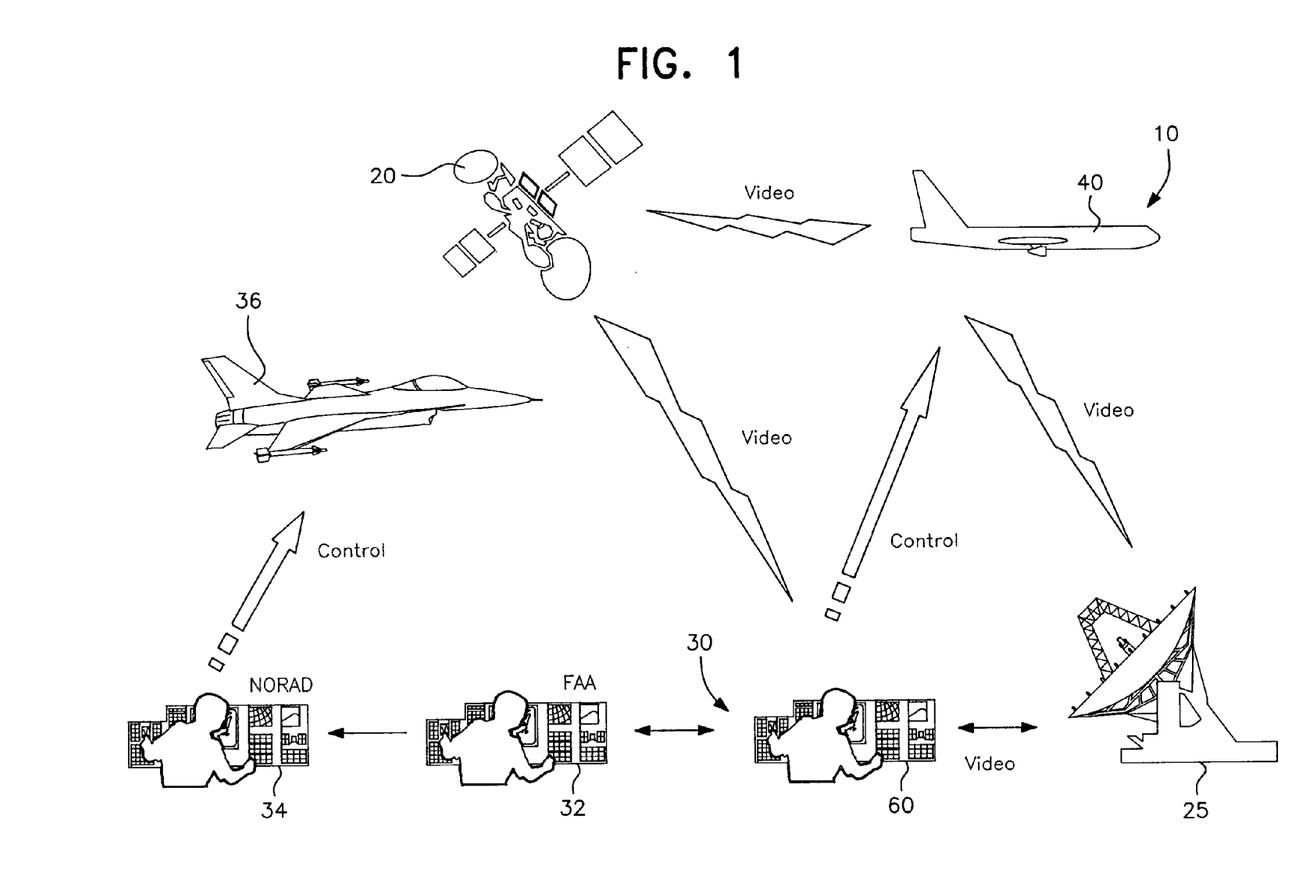
FIG. 1 illustrates the overall architecture and equipment requirements for the video storage and transmission system according to the present invention.

The overall architecture of an airline-based system incorporating the present invention is shown in FIG. 1. As shown, video and control data is transmitted and received between a commercial aircraft 10 and various ground stations, representatively shown by the airline operational center 30, using either satellite communications 20 or wireless telephone communications 25. The major components of the invention include a transmitter 40 on board the aircraft 10, a receiver 60 at the ground station 30, and directly associated equipment. For implementation within the aircraft, cameras, cabin and/or cockpit sensors, cockpit video monitor, aircraft communications and the command and control infrastructure are also employed and, although not actually part of the present invention, are included to better illustrate the invention in one of its preferred embodiments. Communications between the transmitter 40 and receiver 60 may be effected using satellite communications (SATCOM), air phones, microwave, future broadband, or any other suitable medium.

In the event of an incident in the cabin or cockpit of the aircraft 10, a crew member or air marshal on the aircraft can trigger a sensor (not shown) which causes recorded and live video to be sent by the transmitter 40 off the aircraft via satellite communications 20 or air-to-ground wireless telephone communications 25. Alternatively, the initiation of transmission may be triggered automatically by system detection, using an appropriate sensor, of an event of a specified type, such as a gunshot, explosion, power or lighting reduction or loss, smoke or fire (heat), etc.

Once transmission is initiated, the video and audio (optional) received by the receiver 60 is assessed at the first receiving station, usually the airline operational center 30, and is immediately passed to the appropriate authorities depending on the nature of the problem. FIG. 1 depicts handover to the FAA 32 and to NORAD 34 for interdiction by fighter 36. Lesser courses of action could also be coordinated by the airline operational center, including arrangements for medical care or local police upon landing.

The system according to the present invention also provides the capability for the ground station to initiate the flow of video for the purpose of providing real-time or near real-time surveillance of the cabin or cockpit. This capability may be used to ensure the security of the aircraft at the gate or within maintenance facilities, or to evaluate or follow-up on external triggers such as flight path deviations or other security-directed operations.

Figure 2:
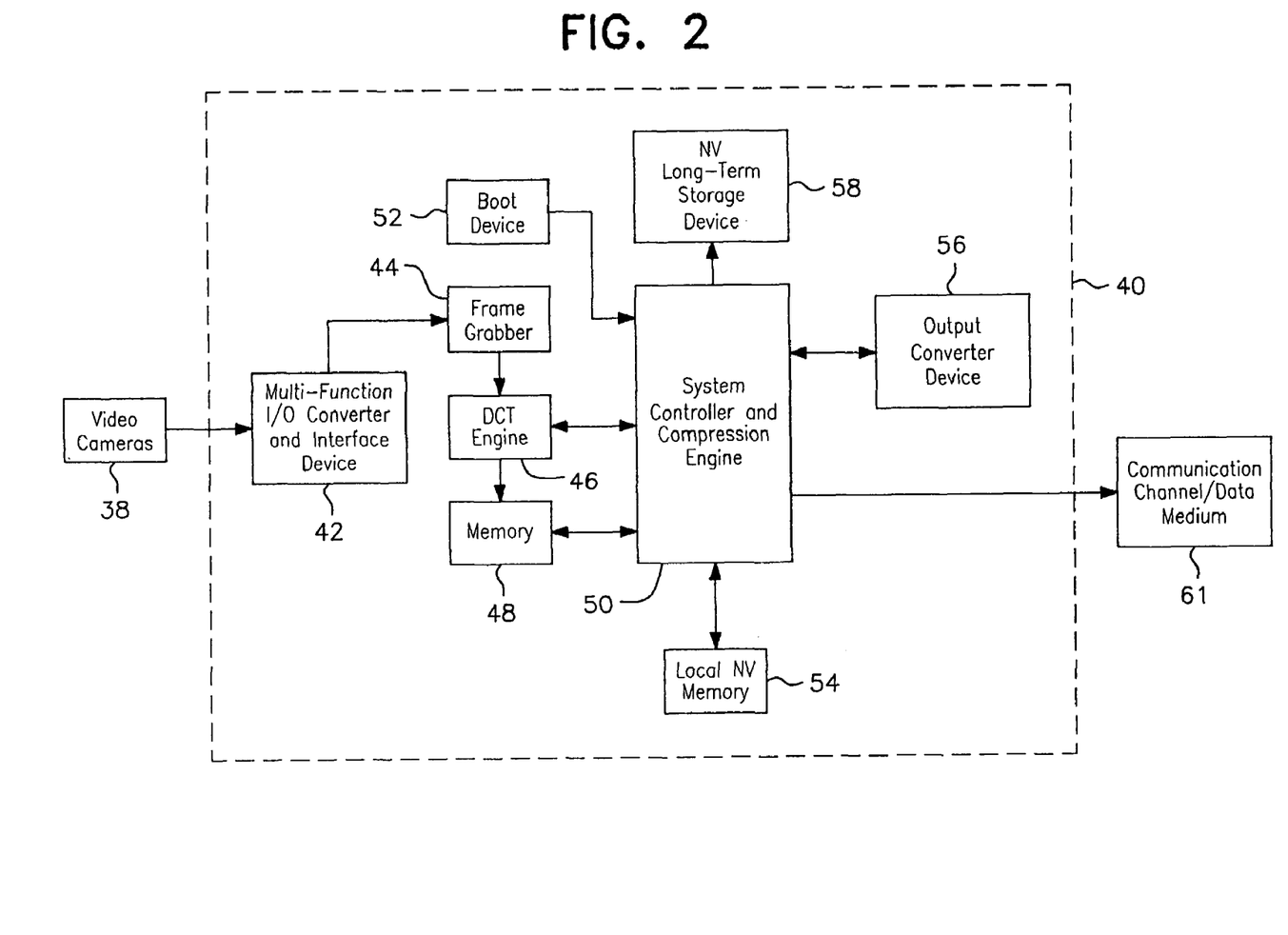
FIG. 2 is a block diagram of the transmitter according to the present invention.

A block diagram of the transmitter 40 is summarized in FIG. 2. Outputs from the video cameras 38 are input to a multifunction input/output converter 42 via either hardwired or wireless connection. The video signal must be present continuously and can be in NTSC, PAL or SECAM composite format; other video formats may also be used effectively with the use of an appropriate converter.

The frame grabber 44 converts the video signal from each camera to digital framed video picture images. Once converted to a digital image file, the images are further processed by the DCT engine 46 with volatile memory 48 to convert the images from the time to frequency domain. The pictures are then processed to minimize the data content of each picture using a system controller and compression engine 50 for storage in local non-volatile (NV) memory 54 or optional long-term memory 58, or for transmission over the communication channel 61. The transmitter may optionally include an output converter device 56 for local viewing of the images, if needed or desired, and the boot device 52 is used to start-up the system controller, in a manner known in the art.

The local memory 54 stores configuration data including set-up/default parameters needed to initialize the system controller and compression engine 50. These parameters control the manner in which the data content is minimized, as will be discussed hereinafter. The memory devices may be embodied using any known memory device such as hard drives, flash memory, optical memory, magneto-optical memory, etc.

Figure 3:
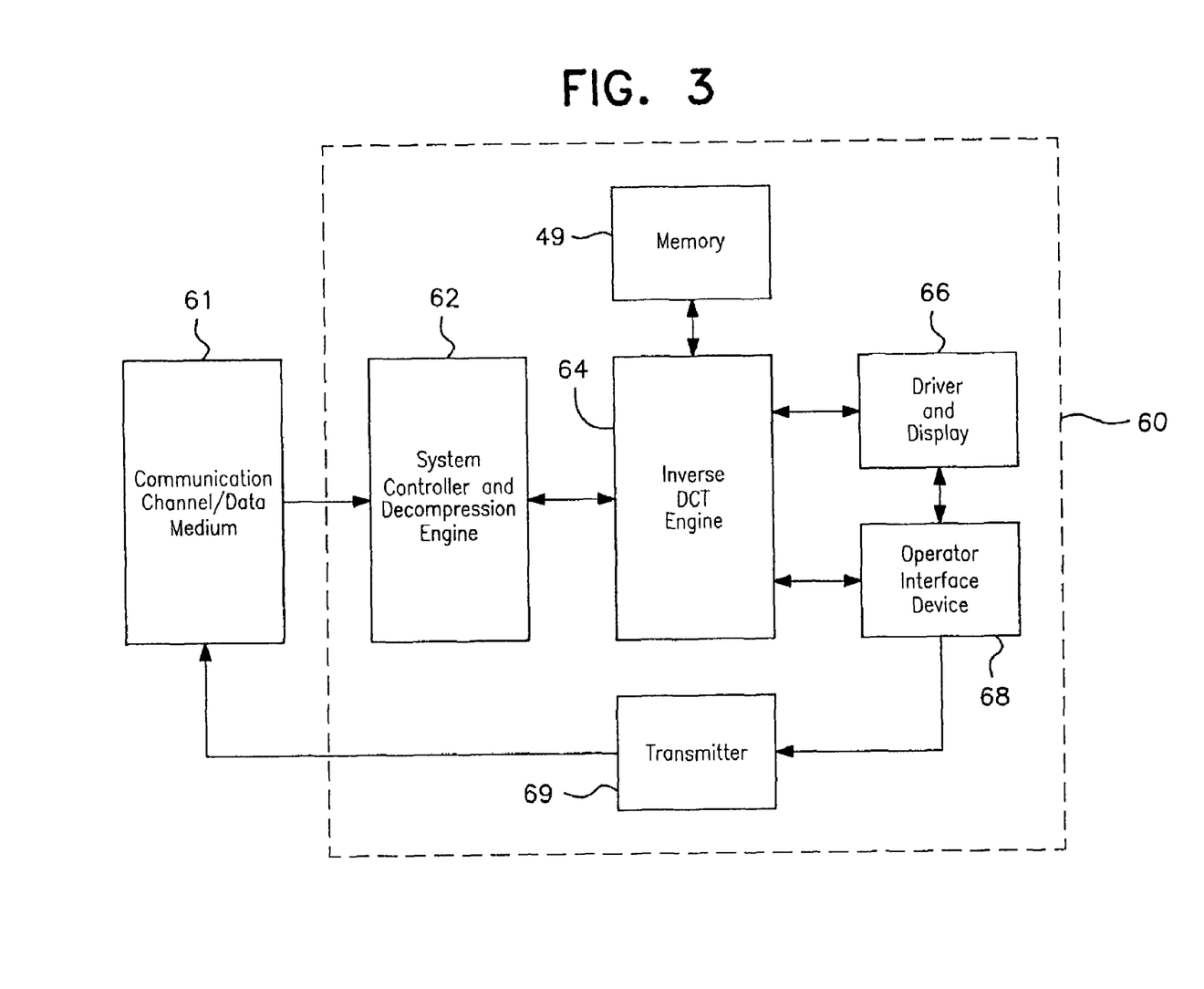
FIG. 3 is a block diagram of the receiver according to the present invention.

The receiver 60 uses the same core functionality as that described for the transmitter, and is generally depicted in FIG. 3. The data flow is in the inverse direction, coming from the communication channel 61 through to a system controller and decompression engine 62 where the signals are reassembled and converted, and then processed by an inverse DCT engine 64 with memory 49. The output is sent to a driver and display 66 and operator interface device 68, where the operator is able to view the incoming video as well as initiate control inputs to the transmitter system 40 using the receiver transmitter 69.

Either the transmitter or the receiver can establish a point-to-point communication path. As already described, the transmitter begins a communication sequence when a trigger is sensed, whether manually or automatically initiated, while the receiver initiates communication when directed to do so by operator input. Once the communication sequence is initiated and the point-to-point link established, the receiver using receiver transmitter 69 sends instructions to the transmitter system 40 requesting the flow of images.

At any time during the subsequent flow of images, the operator can direct the transmitter to change mode, camera selection and camera image quality. The receiver can also place the transmitter into a programming mode that allows access to the local memory 54 in order to change the set-up/default parameters stored therein. Such adjustment capability allows the present invention to adapt to best accommodate special flight needs as might be associated with, for example, high-profile flights or flights determined to be of potentially high-risk. In such scenarios, the parameters may be changed to reduce the change threshold necessary to initiate image transmission, heighten the image quality, etc.

Figure 4:
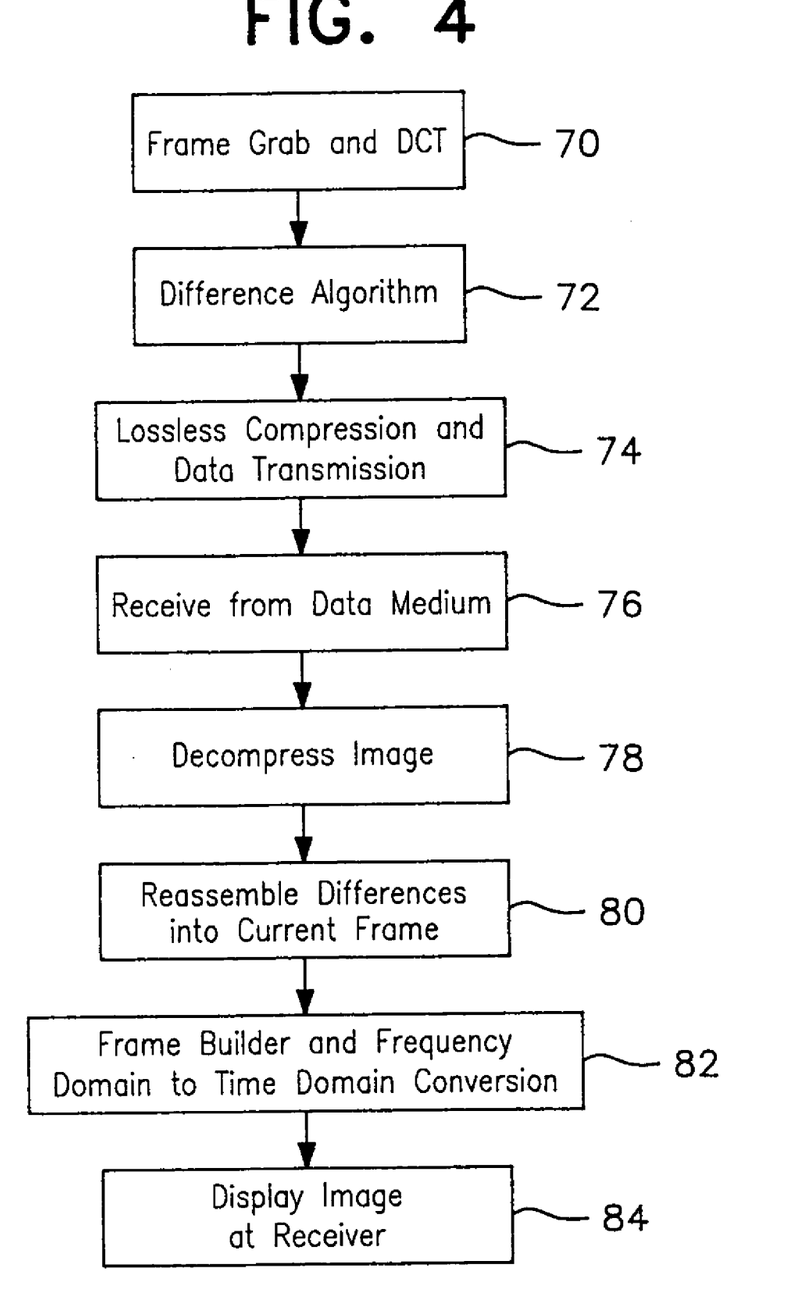
FIG. 4 is a flow chart of the operation of the video storage and transmission system according to the present invention.

The process by which the image data is compressed, transmitted and received in accordance with the present invention is summarized in FIG. 4. The image data is digitized and converted to the frequency domain in the frame grabber and DCT engine, step 70, and then processed by the difference algorithm, step 72, to determine which blocks within the images have changed. Blocks to be transmitted, i.e., those which have changed, undergo lossless compression followed by transmission, step 74, and are thereafter received from the data medium, step 76, at the receiver. The receiver decompresses the image, step 78, and reassembles the differences into the current frame, step 80. In building the frame, an inverse DCT is performed to convert the frequency domain back into the time domain, step 82. The image is then displayed, step 84.

Figure 5:
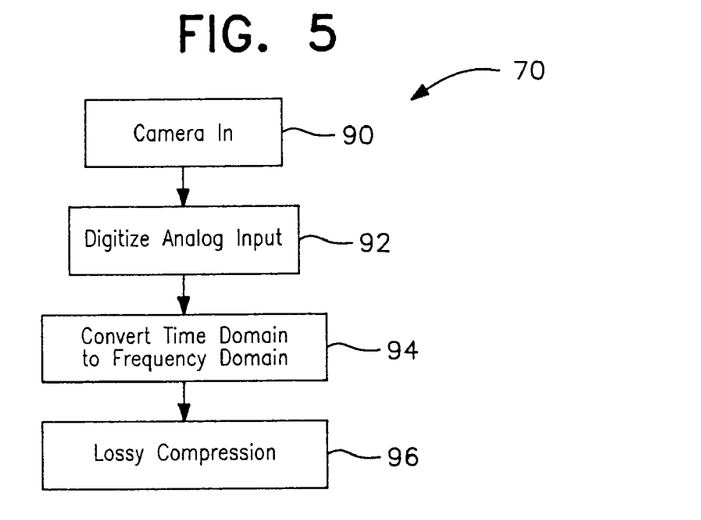
FIG. 5 is a flowchart illustrating in further detail the operation of the frame grab and DCT of FIG. 4.

The processing steps performed by the frame grabber 44 and DCT engine 46 at step 70 are enumerated in greater detail in FIG. 5. When camera video is input, step 90, the multi-function I/O converter 42 digitizes the analog input, step 92, which is provided to the frame grabber 44. The analog input is digitized into a given image size having a pixel resolution that can be any number of pixels down and any number across. An image size of 320 by 240 will be discussed herein as a representative example to clarify the algorithm. The calculations producing the resulting image size, as well as the fact that the resulting pixel resolution will change given a different initial image size, is known in the art and therefore will not be discussed further herein.

The compression algorithm within the compression engine 50 starts out from the input of the frame grabber with the digital representation of the image, where each image pixel is represented by 16 bits of data which will yield an image size of 153600 bytes for a given 320×240 pixel image. The image is then divided into 1200 individual blocks, with each block having 64 bytes. The blocks are individually converted from the time domain to the frequency domain, step 94, through processing with a Discrete Cosine Transform (DCT).

The frequency domain representation is a numeric representation of the image as a sum of sines and cosines preceded by a plurality of luminance coefficients and a plurality of chrominance coefficients which are grouped and combined to represent the blocks of 64 pixels (blocks of pixels eight down and eight across), according to the example used herein. According to a preferred embodiment, a single block of 64 pixels is represented in a numeric format having one DC coefficient and a plurality of AC coefficients, e.g., 63 AC coefficients. The DC coefficient is a magnitude value which acts as a multiplication factor for the remaining AC coefficients. Each AC coefficient indicates a degree of detail, sharpness, edge clarity, etc., so that, as the AC coefficients are accumulated, the image increases in quality and more nearly represents the full clarity of the original scene. A full resolution image as represented with DC and AC coefficients is twice the size of the original image, having 64 bytes for luminance and 64 bytes for chrominance.

The blocks then undergo lossy compression, step 96, by truncating the highest order coefficients, reducing the size of the data file but also resulting in an image that is less sharp than the original. The number of highest order coefficients to be truncated is directly correlated with the quality of image being requested. The chrominance and luminance coefficients may be decimated under operator control until the desired balance point is achieved between file size and resultant image quality. For example, in the frequency domain according to one preferred embodiment, each block has 32 luminance and 32 chrominance coefficients, thus having a size of 76800 bytes, which is half the original image size. Retaining a greater number of luminance AC coefficients will create a sharper image when displayed, while inclusion of more chrominance AC coefficients will make the image colors more vibrant. All of the chrominance coefficients may be discarded in many video recording applications without compromising the value of the resulting images for purposes of event recordal and documentation.

Because the present invention is able to work with any available bandwidth, the size of the image data file determines the overall speed of transmission or frame refresh rate, but does not affect bandwidth requirements. Thus, the operator can predetermine the quality of the images transmitted regardless of the bandwidth or transmission speed of the system being used. A higher quality image will take more time in transmission but does not require greater bandwidth. This tradeoff between speed and quality on the fly, with the ability to operate effectively over any available bandwidth, provides a unique solution to security applications that is simply not possible with MPEG, wavelet or conventional motion JPEG.

The system controller provides for a number of preset quality values to assist the operator in making an appropriate selection. According to the preferred embodiment, the system provides five sets of preprogrammed values, but is infinitely variable between 1 and 32. The default image quality has 16 luminance and 12 chrominance coefficients, yielding 33600 bytes per image and an average size difference due to compression of about 1.8 K bytes per image. This resultant image, which is a full-frame image that is less than half the size of the original image and yet still demonstrates good quality, is subsequently compressed even further through a loss-less compression technique which will be explained in greater detail hereinafter. Using only the default settings, the system yields about another 1.8 times compression of the resultant image, such that an image update offering of 1 KB may be achieved, providing between a 6-1 and an 8-1 advantage over the size reduction possible with comparable wavelet technology.

In addition to the compression just described, the present invention further includes a process by which image changes are identified and only that part of an image which has changed, frame to frame, is transmitted. Through such image change comparison, major improvements in frame update speed are realized, permitting the steady transmission of a series of still images to be presented to the operator at a fast enough refresh rate to lend the impression of flowing video rather than disparate pictures displaced in time. In addition, the differencing performed to identify the changes is all done in the frequency domain which provides benefits not possible with prior art techniques.

The combination of these two processes, compression and selective update, yields update rates ranging from 1–2 frames per second (FPS) at data transmission speeds of 4800 bps, to more than 15 FPS at transmission speeds of 115 bps or above. The system operates automatically in response to the bandwidth that is available, transmitting faster when bandwidth is plentiful and slower when bandwidth is limited. Alternatively, the actual speed of transmission may be "throttled" or bandwidth limited by operator selection so as to use only a portion of the bandwidth that is available, thereby avoiding undue loading on the transmission system as the demand for video increases or when there is a need to share the available bandwidth with voice or other data.

In performing the image change comparison, the algorithm refers to two complete images. The first is a reference image which is that image used by the algorithm to form a baseline, and the second is the current frame image which is the most recent digitized image captured by the system. The reference and current frame images are compared to determine a deviance, either positive or negative, in corresponding coefficient values. The determination as to when to send a new block to replace a previously transmitted block is variable, depending upon the criteria established by the system administrator.

Broadly, the difference algorithm compares each coefficient of a block from the reference image to a corresponding coefficient of the current frame block until a sufficient number of changes or magnitude of difference is found. Once a threshold is reached, the block is marked as "changed" and the process is repeated on the next block.

Figure 6:
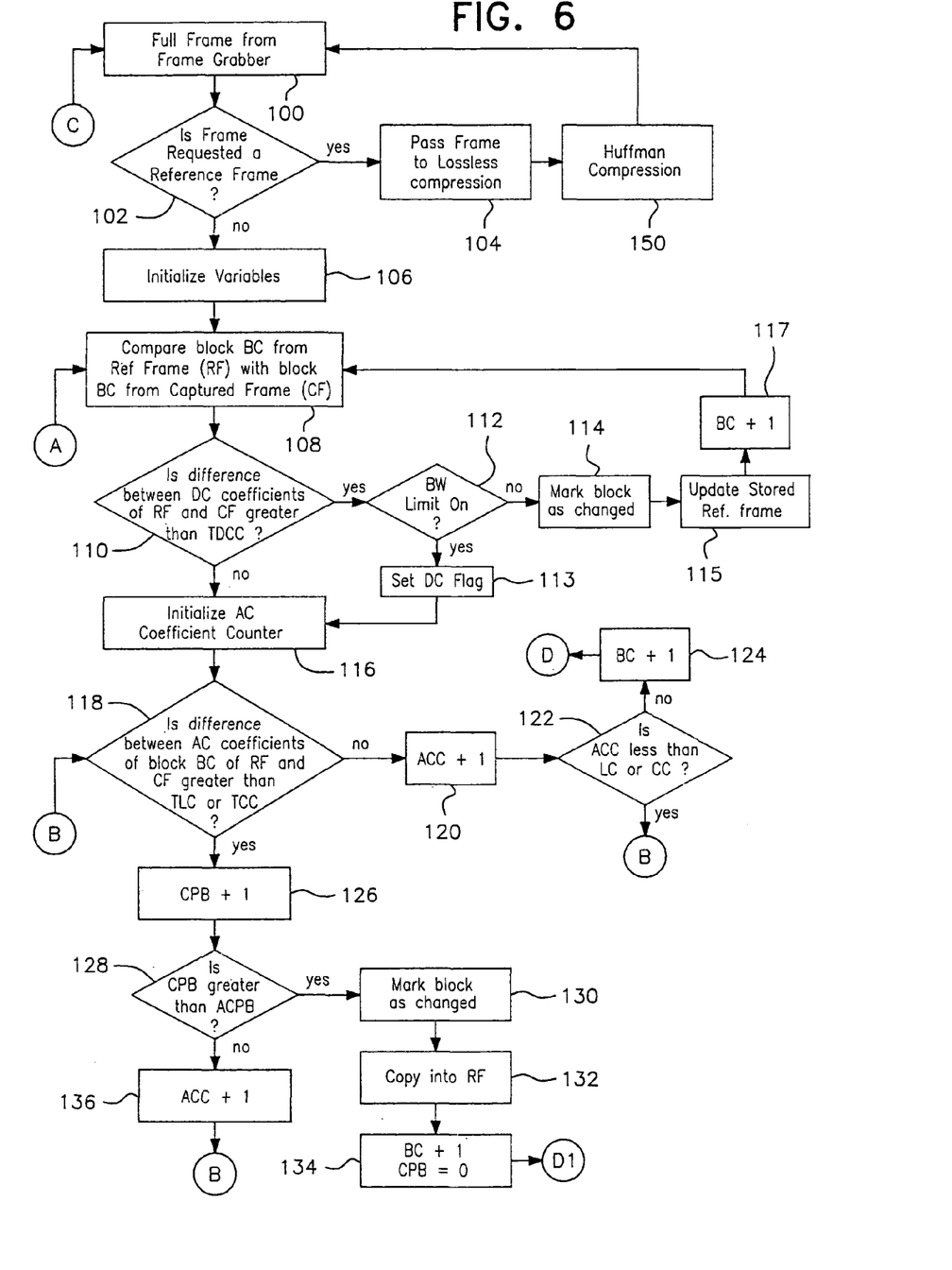
FIGS. 6, 6A and 6B are a flowchart illustrating in further detail the operation of the difference algorithm of FIG. 4.
Figure 6A:
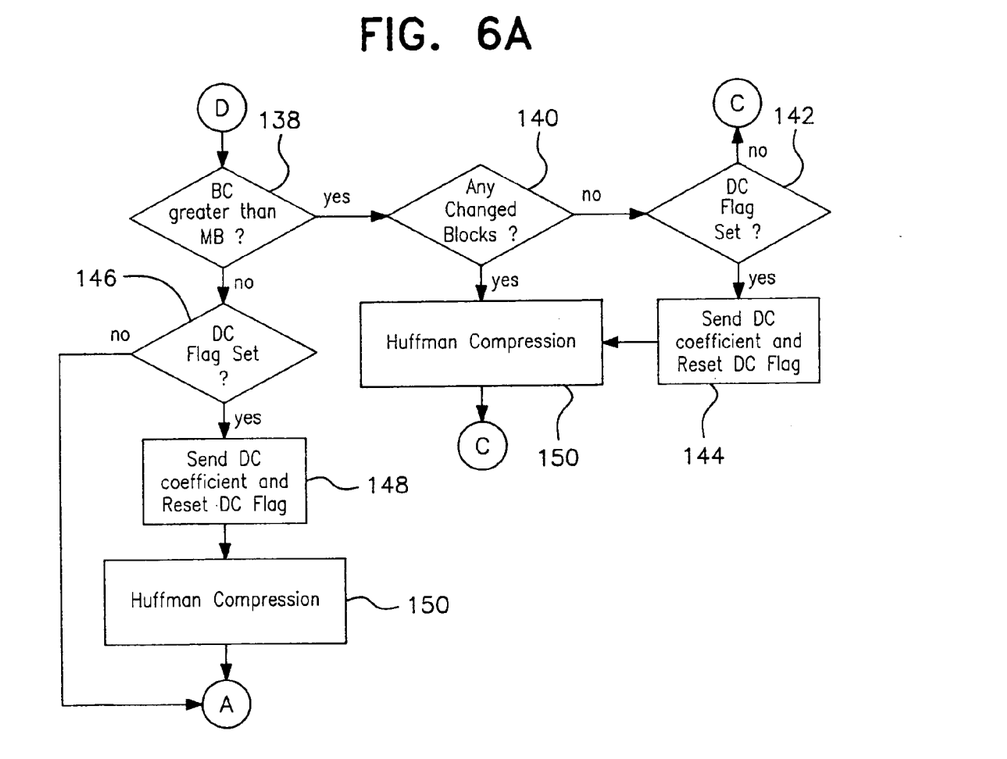

More specifically, as shown in FIGS. 6 and 6A, the process starts out by bringing in a full frame from the frame grabber, step 100, at the desired resolution. This step 100 substantially includes the steps enumerated in FIG. 5.

If the frame requested is a reference frame, step 102, the entire frame is passed onto the lossless compression routine, step 104, for Huffman compression and storage or transmission over the desired medium, step 150. The frame is also stored in the local reference frame holder of a given camera, and the process then continues with a next frame, step 100.

If the frame requested is not a reference frame, step 102, then the variables/parameters are initialized to a set condition, step 106. This initialization includes setting the block counter (BC) to zero, and setting the value of "maximum blocks (MB)" to the number of blocks at the given resolution. Also baselined is the number of luminance coefficients (LC) in a given mode, the number of chrominance coefficients (CC) in the given mode, the number of changes per block (CPB), the number of allowable changes per block (ACPB), the threshold for a given luminance change (TLC), the threshold for a given chrominance change (TCC), and the threshold for allowable DC change (TDCC). These variables, with their programmable set-up/default parameter values, are stored in the local non-volatile memory 54.

The parameter values must also be reinitialized each time a new block is used. In addition, any situation which will require a change in resolution mode will result in an automatic request by the system for a new reference frame so that all stored information is updated, causing all of the aforementioned variables to be properly initialized for the new mode.

The next step is to take the current block, as indicated by the value of the block counter (BC), from the reference frame (RF) and compare it with a corresponding block from the current captured frame (CF), step 108. This is accomplished by first comparing the DC coefficients. It has been determined that if there has been a significant change in this coefficient, then generally the block has changed substantially enough to warrant marking the block as changed; the amount of change necessary to mark the block as changed is variable depending upon the quality of the image being viewed.

In an aircraft communications environment where bandwidth is very limited, however, a bandwidth-limited mode is available. When the bandwidth-limited mode is activated, step 112, the algorithm performs a full comparison of all of the AC coefficients being considered, even when it has been determined that the DC coefficient has undergone a sufficient change to otherwise warrant marking the block as changed. This checking of the AC coefficients is advantageous when bandwidth is limited in that, should it be determined that there has been no significant change in the AC coefficients, the DC coefficient may be transmitted alone, reducing transmission requirements to only one byte rather than the 64 bytes necessary for the entire block.

Assuming that the difference between the DC coefficient of the reference and current frames is greater than TDCC, step 110, if the bandwidth-limited mode is activated, step 112, then a DC flag or other indicator is set, step 113, marking the change in the DC coefficient. Conversely, if the difference between the DC coefficients of the RF and CF is greater than the threshold for allowable DC change (TDCC), step 110, and the bandwidth-limited mode is not activated, step 112, then the block is marked as changed, step 114, and the stored reference frame is updated, step 115, to reflect the new change. The block is copied in its entirety into the reference frame so that once something enters the field of view for the given camera, the reference frame will be updated to reflect this change, thus minimizing the need to redraw the same change repetitively in subsequent frames. The block counter (BC) is incremented by one, step 117, and the process then repeats at step 108 with a next block.

If the difference between the DC coefficients of the RF and CF is not greater than the threshold for allowable DC change (TDCC), step 110, or if the change in DC coefficient is greater than the threshold but the bandwidth-limited mode is activated and the DC flag has been set, step 113, then the AC coefficient counter (ACC) is initialized, step 116. Upon initialization, the ACC is set to zero, and the number of changes in a given block (NCB) is also set to zero. Thereafter, each of the remaining AC coefficients within the CF is compared with a corresponding AC coefficient in the RF to determine if there are respective differences which are greater than the established thresholds for luminance (TLC) and chrominance (TCC).

According to different embodiments of the present invention, all of the AC coefficients may undergo comparison or the comparison process may continue through only as many AC coefficients as are necessary to determine that sufficient change has occurred to warrant marking the block as changed. The magnitude which constitutes "sufficient" is represented by the allowable number of changes per block (ACPB) in the embodiment depicted in FIG. 6. This parameter may be changed to suit particular surveillance requirements, as has already been noted.

Which of these two alternatives is preferable will often depend upon the amount of bandwidth available versus the processing power of the difference algorithm. In cases with limited bandwidth, for example, comparison of all of the coefficients is advantageous to avoid any unnecessary transmission of data. Conversely, where bandwidth is not at a premium and processing speed is slow, a block is best marked as changed sooner in the comparison process, i.e., before all of the AC coefficients have been compared. In the limited-bandwidth aircraft scenario, typically all of the AC coefficients are compared.

If the difference between a first corresponding pair of AC coefficients is not greater than the TLC or the TCC (depending on mode), the AC coefficient counter (ACC) is incremented by one, step 120, and compared with the number of luminance coefficients (LC) and chrominance coefficients (CC) in the current mode. If the ACC is less than the LC or the CC, step 122, then the process continues with a next AC coefficient, step 118.

If the ACC is not less than the LC or the CC, step 122, then the maximum number of luminance or chrominance coefficients for a given mode has been surpassed without reaching the preset allowable number of changes per block (ACPB). In this circumstance, the block counter (BC) is incremented by one, step 124 and, as shown in FIG. 6A, the BC is compared with the maximum blocks (MB) established during initialization. If the BC is greater than MB, step 138, the block counter has surpassed the maximum number of blocks for a given image mode. When this point is reached, if there are blocks marked as changed, step 140, these changed blocks are passed to a lossless compression where they undergo Huffman compression for transmission or storage, step 150, after which the process continues with a next digitized frame at step 100.

In the event there are no blocks marked as changed, step 140, i.e., there has been no change in the AC coefficients sufficient to mark the block as changed, the status of the DC flag is checked. If the flag is not set, step 142, the process continues with a next digitized frame at step 100. If the flag is set, step 142, then the flag is reset and the DC coefficient sent, step 144, to Huffman compression for transmission or storage, step 150, after which the process continues with a next digitized frame at step 100.

If BC is not greater than MB, step 138, the status of the DC flag is checked. If the flag is not set, step 146, the process continues with a next block at step 108. If the flag is set, step 146, then the flag is reset and the DC coefficient sent, step 148, to Huffman compression for transmission or storage, step 150, after which the process continues at step 108 with a next block.

If the difference between the AC coefficient of block BC of the RF and CCF is greater than the threshold for the luminance (TLC) or chrominance (TCC), step 118, then the counter tracking the number of changes per block (CPB) is incremented by one, step 126. This is done because, even if a given AC coefficient had a change, a single change in one coefficient does not warrant marking the block as changed. Instead, the block is marked as changed only if the number of changes within the block as a whole exceed a predetermined threshold. Accordingly, the incremented counter (CPB) is then checked to see if the value of the counter is greater than the currently specified threshold of allowable changes (ACPB).

Figure 6B:
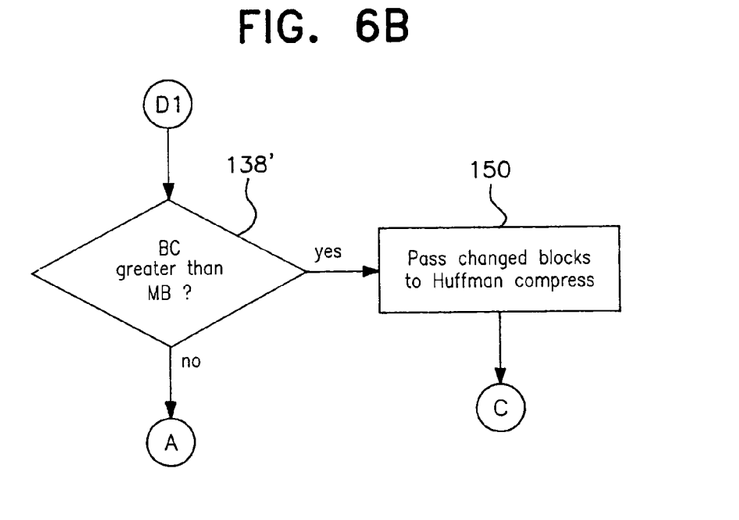

If the CPB is greater than the number of allowable changes per block (ACPB), step 128, then the block is marked as changed, step 130, and copied into the reference frame, step 132. The block counter (BC) is incremented by one and the CPB is set to zero, step 134. As shown in FIG. 6B, if the BC is greater than the set maximum number of blocks (MB), step 138', then the blocks identified as changed are passed to Huffman compression for transmission or storage, step 150, after which the process continues with a next digitized frame at step 100. Similarly, if BC is not greater than MB, step 138', then the process continues with a next block, step 108.

If the CPB is not greater than the number of allowable changes per block (ACPB), step 128, then the AC coefficient counter (ACC) is incremented by one, step 136, and the process proceeds with comparison of a next AC coefficient, step 118. As shown, the process proceeds back through this loop until there are enough changes to warrant sending the block or until all the AC coefficients have been compared. If insufficient changes are found within the block, then the block is considered to have remained essentially unchanged, requiring no transmission thereof, or transmission of only the DC coefficient, and examination of the next block begins.

In addition to updating the reference image in response to image changes, the age of the blocks within the reference frame is tracked to improve the integrity of the reference image even when there has been insufficient change for reference updating. Once the reference is substantially aged, e.g., 30 frames have elapsed, the oldest blocks are updated with the respective blocks of the current frame image. This aging update takes care of situations in which, particularly at lower quality settings, the current frame image is changing so minimally that the blocks are not marked as changed, e.g., sunrise and sunset.

Figure 7:
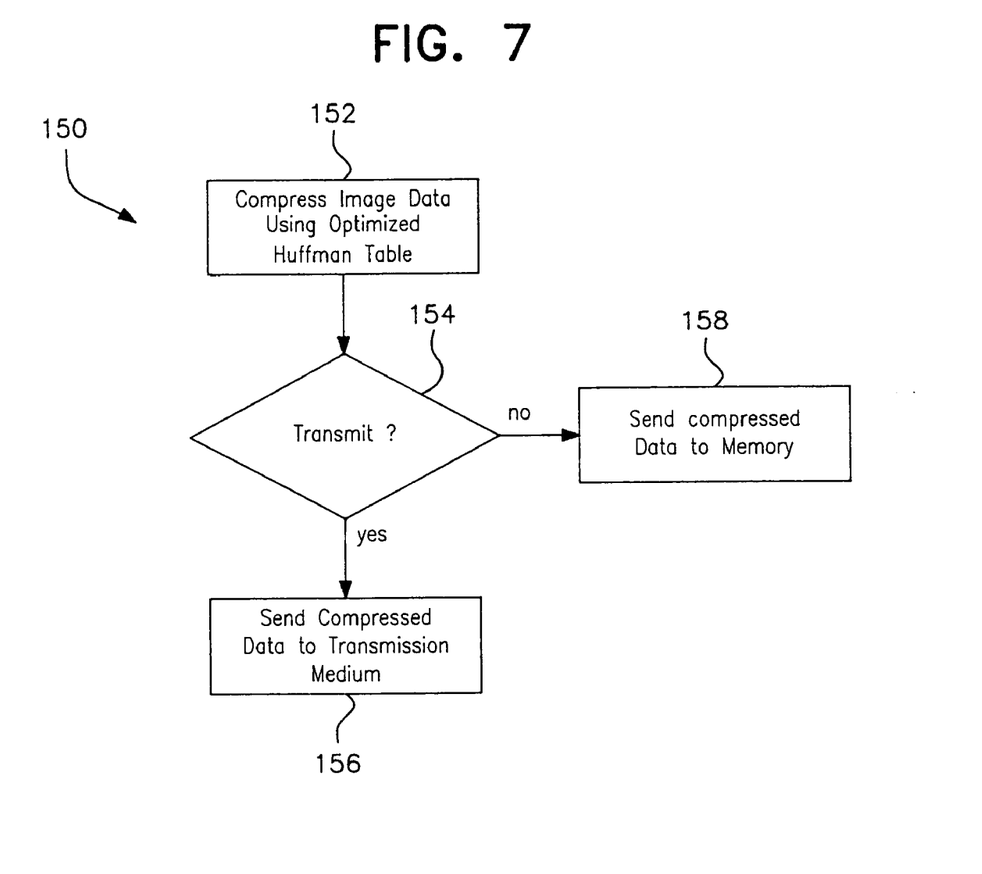
FIG. 7 summarizes the lossless compression and data transmission process of FIG. 4.

FIG. 7 summarizes the lossless compression and data transmission process 74 undertaken in step 150. All of the blocks that have been marked as changed and copied into the reference image are passed into Huffman compression, step 152. The Huffman table is optimized to reflect the most commonly occurring values so that the Huffman compress typically yields an additional 1.7 to 2.6 of lossless compression of the image data. If transmission has been enabled, step 154, the compressed data is thereafter sent directly to the transmission medium, step 156, where it is packetized, with each packet assigned a sequence number. The packets are sent in sequence to the receiver but, if one of the packets is not received, retransmission of that packet may be requested and the packet thereafter received out of sequence, with cyclical redundancy checking being used for error detection, as is known in the art. If transmission has not been enabled, step 154, the compressed data is sent to memory, step 158, where it is stored. The stored data may thereafter be transmitted in the event that either the transmitter or the receiver initiates a communication sequence, generally in response to an alarm condition.

The sending of compressed data to memory allows the system, upon initiation of a communication sequence, to transmit video from a point in time before the alarm, the "pre-alarm recall" feature referred to earlier. However, to improve the performance of this feature, the present invention employs an innovative method of handling these pre-alarm images that is of particular value in limited bandwidth scenarios.

For the pre-alarm images to be of greatest value in a limited bandwidth environment, it is necessary that the operator wanting to view these images be able to see the most recent pre-alarm image first. This imposes the requirement for storage of whole images in memory. However, given the size of the images and the very small bandwidth available in an aircraft environment, it can take an unacceptable length of time to send even a limited number of images.

Figure 8:
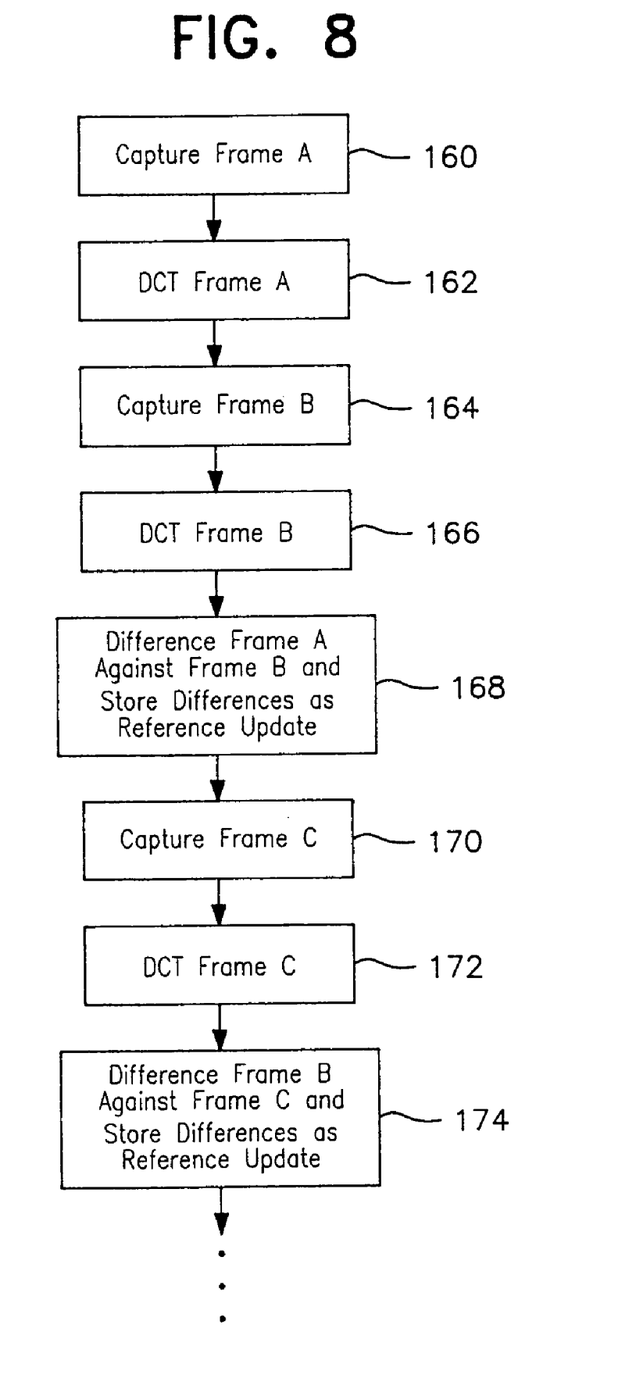
FIG. 8 is a flowchart of the "backwards" differencing method for pre-alarm images, in accordance with the present invention.

To address this problem, the present invention uses the basic differencing technique summarized in FIGS. 6 and 6A, but in a "backwards" manner relative to the reference frame in order to reduce the amount of data to be stored while also providing the most recent pre-alarm image to the operator. As summarized in FIG. 8, using the "backwards" differencing method, a first image (Frame A) is captured, step 160, and processed by the DCT engine to convert the image from the time to frequency domain, step 162. A second image (Frame B) is captured, step 164, and similarly processed, being "DCT'd" to convert the image from the time to frequency domain, step 166. Differences between Frames A and B are then determined, but instead of using Frame A as the reference and differencing Frame B against A, Frame B is the reference frame and Frame A is differenced against B, with differences therebetween being stored as a reference update, step 168. Next, a third image (Frame C) is captured, step 170, and processed by the DCT engine to convert the image from the time to frequency domain, step 172. Again, instead of using Frame B as the reference and differencing Frame C against B, Frame C is the reference frame and Frame B is differenced against C, with differences therebetween being stored as a reference update, step 174. This process continues, with the latest frame becoming the reference frame against which the previous frame is differenced, until an alarm condition is detected at which time the newest pre-alarm reference frame is sent, followed by the previous updates. In this way, memory and bandwidth requirements for pre-alarm image storage and transmission are reduced without sacrificing the value of the resulting image data.

Limited bandwidth environments, such as those associated with air traffic, also increase the performance penalty associated with frame rate. To address this problem, the present invention employs a low bandwidth, high latency transmission medium. However, with such a high latency transmission medium, the timeout settings otherwise used for ordinary, non-bandwidth limited communications, which may be on the order of 3 seconds, must be adjusted to prevent the system from becoming unstable. Accordingly, in the limited bandwidth scenario, timeout settings for both acknowledgment packets and retransmitted packets are lengthened and can be up to 14 seconds, or more, although in some instances the shorter timeout periods may still be used.

The foregoing descriptions and drawings should be considered as illustrative only of the principles of the invention. The invention may be implemented in a variety of systems and is not limited to the aircraft scenario of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A bandwidth-independent method for recording and transmitting video images, comprising the steps of:
    inputting a first analog video image from a camera device into a transmitter system;
    digitizing said first analog video image to a first bit map frame and dividing said first frame into a first plurality of individual blocks to define a reference frame;
    inputting a second analog video image from a camera device into a transmitter system;
    digitizing said second analog video image to a second bit map frame and dividing said second frame into a second plurality of individual blocks to define a current frame;
    performing a discrete cosine transform (DCT) to convert each of said first and second plurality of blocks from a time domain to a frequency domain, each block subsequent to said DCT being represented by a sum of sines and cosines preceded by a DC coefficient and a plurality of AC coefficients;
    truncating higher order AC coefficients within said plurality of AC coefficients to effect lossy compression of said sum;
    for each block, comparing the DC coefficient from the reference frame with the DC coefficient for a corresponding block in the current frame;
    for each block, comparing a first plurality of AC coefficients from said reference frame with a second plurality of AC coefficients for the corresponding block from said current frame;
    identifying any blocks within said plurality of blocks for which a difference between said DC coefficients exceeds a threshold value as a changed DC coefficient;
    identifying any blocks within said plurality of blocks for which a difference between at least one of said first and second pluralities of AC coefficients exceeds a threshold value as changed blocks;
    transmitting at least one of said changed DC coefficient and said changed blocks to a receiver or storage device as changes, unchanged blocks not being transmitted; and
    updating the reference frame with any changes.

2. The method as set forth in claim 1, further comprising the steps of:
    receiving changes at the receiver;
    performing an inverse DCT on changed blocks for conversion from the frequency domain to the time domain; and
    displaying a resulting image at the receiver.

3. The method as set forth in claim 1, wherein said step of truncating is dynamically adjustable on a real time basis to alter an image quality of said video image transmitted to said receiver or storage device.

4. The method as set forth in claim 1, wherein said step of transmitting is initiated by said receiver.

5. The method as set forth in claim 1, wherein said step of transmitting is initiated by said transmitter system in response to a sensed trigger indicating an alarm condition.

6. The method as set forth in claim 1, wherein said steps of comparing and identifying include the steps of:
    comparing DC coefficients of said current and reference frames;
    in response to identifying a difference therebetween that is greater than a threshold value, setting a DC coefficient indicator;
    comparing each of said plurality of AC coefficients from said current frame with a corresponding AC coefficient from said reference frame; and
    in an absence of differences between said plurality of current frame AC coefficients and said corresponding AC coefficients from said reference frame that exceed a threshold value, transmitting only said changed DC coefficient to said receiver.

7. The method as set forth in claim 1, further comprising after the step of identifying and before the step of transmitting, the step of performing a lossless compression on said changed blocks.

8. The method as set forth in claim 7, wherein said step of performing a lossless compression includes performing a Huffman compression.

9. The method as set forth in claim 1, wherein when said changed blocks are transmitted to the storage device, the reference frame changes with each incoming frame so as to be maintained as a most recent image.

10. The method as set forth in claim 9, wherein images sent to the storage device represent pre-alarm images and are stored according to image changes relative to the most recent image as the reference frame, a determination of said changes and storing thereof comprising the steps of:
    capturing a first image and converting said first image from a time to frequency domain;
    capturing a second image and converting said second image from the time to frequency domain;
    using said second image as the reference frame, differencing the first image against the second image and storing any differences therebetween as a reference update;
    capturing a third image and converting said third image from the time to frequency domain;
    using said third image as the reference frame, differencing the second image against the third image and storing any differences therebetween as a reference update; and
    continuing to use a latest frame as the reference frame against which a next previous frame is differenced, until an alarm condition is detected at which time transmission begins with a most recent reference frame.

11. A bandwidth-independent system for recording and transmitting video images comprising a transmitter unit on-board an aircraft and a remotely located, ground-based receiver unit, the transmitter unit including:
   a multi-function input/output converter and interface device for receiving an analog video image from a camera device on board the aircraft;
   a frame grabber for digitizing said analog video image to a bit map frame and dividing said frame into a plurality of individual blocks;
   a DCT engine coupled to said frame grabber for performing a discrete cosine transform (DCT) to convert each of said plurality of blocks from a time domain to a frequency domain, each block after said DCT being represented by a sum of sines and cosines preceded by a first plurality of coefficients;
   an on-board storage device coupled to said DCT engine for storing a reference frame;
   a system controller and compression engine coupled to said DCT engine for truncating higher order coefficients to effect lossy compression of said sum, said controller and compression engine including an algorithm for comparing a remainder of said first plurality of coefficients with a second plurality of coefficients from a corresponding block in said reference frame for each of said plurality of blocks, said algorithm identifying those blocks within said plurality of blocks for which a difference between at least one of said remaining first and second pluralities of coefficients exceeds a threshold value as changed blocks;
   a lossless compression device for compressing and transmitting said changed blocks to the receiver over a high latency transmission medium or to said on-board storage device, unchanged blocks not being transmitted; and
   said on-board storage device storing the reference frame updated with the changed blocks.

12. The system as set forth in claim 11, wherein said receiver unit initiates transmission of said changed blocks from said transmitter.

13. The system as set forth in claim 11, wherein said transmitter unit initiates transmission of said changed blocks in response to a sensed trigger on said aircraft indicating an alarm condition.

14. The system as set forth in claim 11, wherein a number of higher order coefficients truncated by said system controller and compression engine is dynamically controllable on a real time basis by a system user to vary an image quality of said video image.

15. The system as set forth in claim 11, wherein the receiver unit comprises:
   a system controller and decompression engine;
   an inverse DCT engine;
   a display device for viewing video images; and
   a receiver transmitter for sending control information to said on-board transmitter unit.

16. A bandwidth-independent method for recording and transmitting video images from a transmitter system on-board an aircraft to a ground-based receiver system, comprising the steps of:
   inputting a first analog video image from a camera device into a transmitter system;
   digitizing said first analog video image to a first bit map frame and dividing said first frame into a first plurality of individual blocks to define a reference frame;
   inputting a second analog video image from a camera device into a transmitter system;
   digitizing said second analog video image to a second bit map frame and dividing said second frame into a second plurality of individual blocks to define a current frame;
   performing a discrete cosine transform (DCT) to convert each of said first and second plurality of blocks from a time domain to a frequency domain, such that each block is represented by a sum of sines and cosines preceded by a plurality of coefficients that includes a coefficient subset;
   comparing coefficients including said coefficient subset of said first plurality of blocks with corresponding coefficients of said second plurality of blocks, respectively;
   identifying those blocks having coefficient changes that exceed a threshold value;
   transmitting, in response to determining that said coefficient changes affect only coefficients in said coefficient subset, only said coefficient subset to at least one of an on-board storage device within said transmitter system and said ground-based receiver;
   marking those blocks having coefficient changes beyond any in said coefficient subset as changed blocks and transmitting said changed blocks to at least one of an on-board storage device within said transmitter system and said ground-based receiver, unchanged blocks not being transmitted; and
   updating the reference frame with received changes.

17. The method as set forth in claim 16, wherein said reference frame is subsequent in time to said current frame.

18. The method as set forth in claim 17, wherein said changed blocks are transmitted to the on-board storage device and represent pre-alarm images, with the reference frame changing with each incoming frame so as to be maintained as a most recent image, a determination of image changes relative to the most recent image as the reference frame comprising the steps of:
   capturing a first image and converting said first image from a time to frequency domain;
   capturing a second image and converting said second image from the time to frequency domain;
   using said second image as the reference frame, differencing the first image against the second image and storing any differences therebetween as a reference update;
   capturing a third image and converting said third image from the time to frequency domain;
   using said third image as the reference frame, differencing the second image against the third image and storing any differences therebetween as a reference update; and
   continuing to use a latest frame as the reference frame against which a next previous frame is differenced, until an alarm condition is detected at which time transmission begins with a most recent reference frame.

19. A bandwidth-independent method for recording and transmitting video images using a transmitter system with a camera device on-board an aircraft to a ground-based receiver system, comprising the steps of:
   capturing a first image with said camera device and converting said first image from a time to frequency domain;
   capturing a second image with said camera device and converting said second image from the time to frequency domain;

using said second image as the reference frame, differencing the first image against the second image and storing any differences therebetween as a reference update;

capturing a third image with said camera device and converting said third image from the time to frequency domain;

using said third image as the reference frame, differencing the second image against the third image and storing any differences therebetween as a reference update; and continuing to use a latest frame as the reference frame against which a next previous frame is differenced, until an alarm condition on said aircraft is detected;

transmitting, in response to said alarm condition, stored images to said receiver system beginning with a most recent reference frame;

continuing to input subsequent analog video images from the camera device into the transmitter system;

digitizing said subsequent analog video images to bit map frames and dividing said frames into individual blocks;

performing a discrete cosine transform (DCT) to convert each of said blocks from a time domain to a frequency domain;

for each block, comparing coefficients thereof with coefficients of a corresponding block from a reference frame that is previous in time;

identifying any blocks for which a difference between said coefficients exceeds a threshold value as a changed block;

transmitting only said changed blocks to said receiver system, unchanged blocks not being transmitted.

\* \* \* \* \*